Feb. 14, 1939.   E. W. SWANSON   2,146,779
GENERATOR VOLTAGE REGULATION
Filed Dec. 28, 1936   2 Sheets-Sheet 1

INVENTOR.
EDWIN W. SWANSON
BY Akel C. Benson
HIS ATTORNEY

Feb. 14, 1939.  E. W. SWANSON  2,146,779
GENERATOR VOLTAGE REGULATION
Filed Dec. 28, 1936  2 Sheets-Sheet 2

INVENTOR.
EDWIN W. SWANSON
BY Akel C. Benson
HIS ATTORNEY

Patented Feb. 14, 1939

2,146,779

UNITED STATES PATENT OFFICE 2,146,779

GENERATOR VOLTAGE REGULATION

Edwin W. Swanson, Hopkins, Minn., assignor to Electric Machinery Manufacturing Company, Minneapolis, Minn.

Application December 28, 1936, Serial No. 117,826

17 Claims. (Cl. 171—119)

My invention relates to the regulation of alternating current generators and particularly to means for controlling the voltage thereof.

In a copending application, Serial No. 72,596, filed April 3, 1936, I have disclosed and claimed a somewhat similar system for automatically regulating certain electrical systems including a synchronous motor.

The principal object of the invention is to provide a voltage regulator automatically and inherently responsive to changes in the voltage, current and/or power factor of the load on the alternating-current generator.

A specific object of the invention resides in providing control means for regulating the voltage of a generator by controlling the direct-current excitation to the field winding of the generator so as to obtain better voltage regulation over the entire load range of the generator.

Another object of this invention is to provide a regulator which will be instantly responsive to any change in the characteristics of the generator load and which will instantly vary the direct-current excitation to control the generator voltage.

Another object of the invention is to provide a regulator system which reduces the magnitude of voltage dips or rises due to applying or removing load on the generator.

A further object of the invention is to provide a regulator simple and economical in design, and one which may have no moving parts or contacts.

A further object of the invention is to provide a regulator which will maintain the generator voltage substantially constant under all conditions of load from no load to full load.

A further object of my invention is to provide a voltage regulator by which any degree of over-compounding or under-compounding may be obtained.

Another object of the invention is to provide a method of voltage regulation in which the corrective effect is a function of the generator voltage, load current and load power factor, co-ordinating the correct action of each to derive a net result which will compensate for each of the above variables under all conditions.

Another object of the invention resides in providing a regulator including rectifying means for providing field excitation current without the use of the usual direct-current exciters or generators.

Another object of the invention is to provide a regulating device having a magnetic core of three or more legs with inductive windings disposed thereon and connected in such a manner that the flow of flux is in the same general direction through one of the legs.

Another object of the invention is to provide a regulating device which includes a regulating winding energized by the resultant flux of two windings which in turn are energized by the voltage and the current of the generator.

These and other objects and advantages of the invention will be fully set forth in the following description made in connection with the accompanying drawings which illustrate several modifications of my invention, and in which like reference characters refer to similar parts throughout the several views, and in which:—

Figure 6:
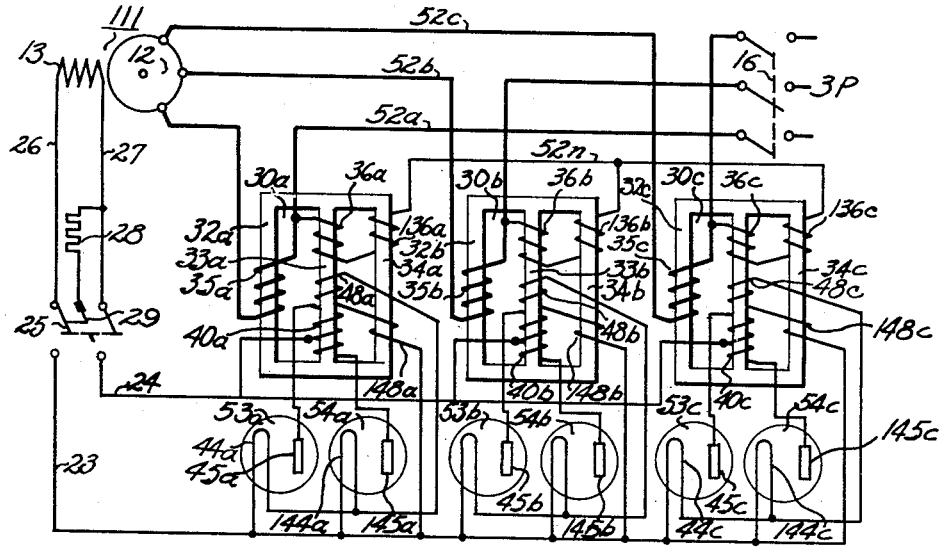
Fig. 6 is a wiring diagram illustrating a form of the invention similar to that shown in Figure 3.
Figure 7:
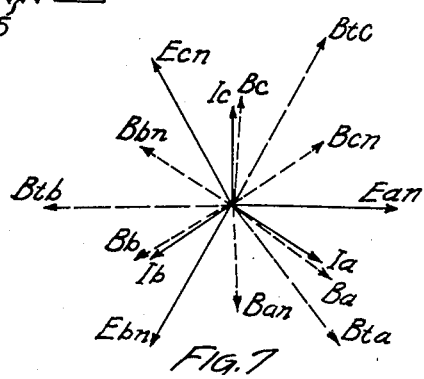

Fig. 7 as a vector diagram illustrating the relation of the currents, voltages and fluxes in the embodiment of my invention shown in Figure 6.

Figure 8:
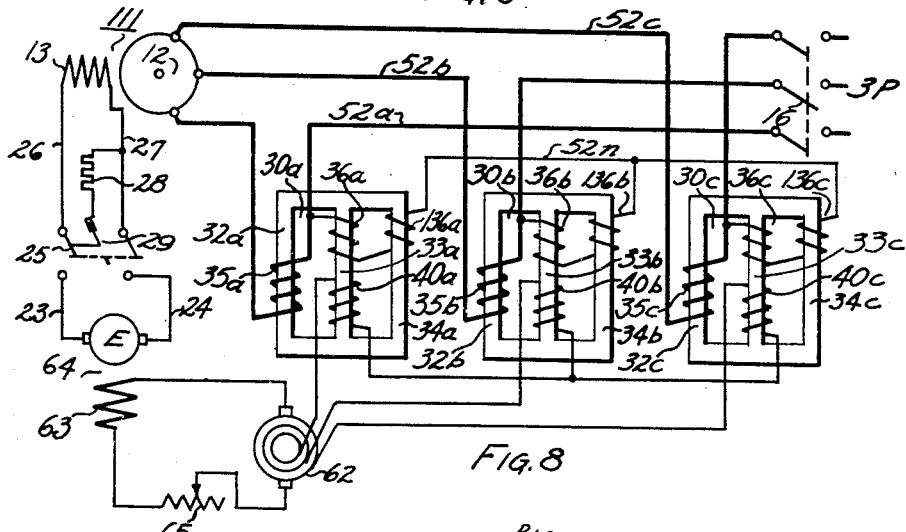

Fig. 8 is a wiring diagram illustrating a modification of the form of the invention shown in Fig. 6.

Most voltage regulators in use today are responsive to a change in voltage, which change must occur before the regulator begins to function. Such regulators are not instantly responsive to control the voltage and they usually include moving parts and contacts. Also in cases of voltage dips or voltage rises, the magnitude of the voltage change is quite substantial compared to the magnitude when using my invention. The present invention overcomes all of these objections by varying the field excitation current in accordance with the load so that any desired performance of the generator can be procured. The structure for producing these results will now be described in detail.

Figure 1:
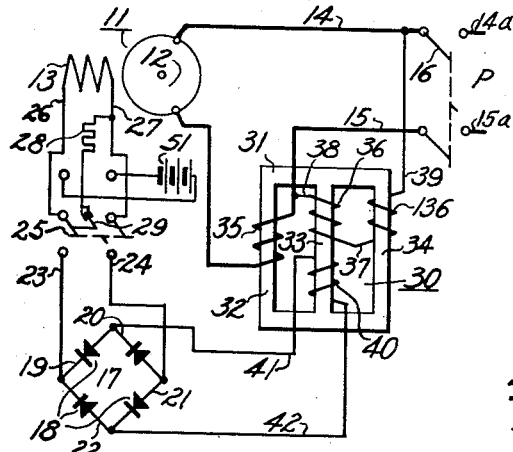
Fig. 1 is a wiring diagram illustrating an embodiment of my invention for use with single-phase power.

In Fig. 1 is illustrated an alternating-current generator 11 of single-phase type having an armature 12 and a field winding 13. The generator is driven by a prime mover (not shown) and delivers alternating current through leads 14 and 15 which are connected by means of a switch 16 to a power supply line P comprising leads 14a and 15a.

A bridge rectifier 17 is used to supply direct-current excitation to the generator field winding 13. This rectifier 17 comprises four rectifying elements 18 which are connected together in the form of a bridge by means of conductors 19, 20, 21 and 22.

The conductors 19 and 21 are connected to conductors 23 and 24 respectively which in turn are connected to a field switch 25. This switch is further connected by means of leads 26 and 27 to the field winding 13. In conjunction with the field winding 13, a field discharge resistance 28 is employed, which is connected to the lead 27 and to an auxiliary switching member 29 operable with the switch 25 and connected to lead 26. This resistance prevents injury to the field winding due to any high induced voltages therein when the switch is opened.

In normal operation, field excitation current is derived from the alternating-current generator proper. To provide excitation current for starting, a source of direct current such as a battery 51 is employed. Field switch 25 is for the purpose constructed as a double-throw switch whereby the battery 51 may be connected to the field winding 13 or whereby the said winding may be connected to the aforementioned source of excitation.

My invention includes a regulating device which I have indicated in its entirety by the reference numeral 30. This regulating device comprises a magnetic core 31 constructed with three parallel branches or legs 32, 33, and 34. The leg 32 is provided with a current winding 35 which is connected in the lead 15 to the generator armature 12. This winding receives the entire current flowing in the armature, though, if desired, only a portion of the armature current may be utilized. The leg 33 is provided with a voltage winding 36 and the leg 34 is likewise provided with a voltage winding 136. These windings are connected together by means of a conductor 37, the connection being such that both windings produce flux in the same direction in the magnetic circuit including legs 33 and 34. The voltage windings, 36 and 136, are further connected to conductors 38 and 39 which in turn are connected to the leads 15 and 14 respectively, thus subjecting the windings 36 and 136 in series to the generator voltage. The current winding 35 and the voltage windings 36 and 136 are so connected that the resultant flux in the center leg 33 is of greater magnitude than that of the flux produced by the current winding 35 or the flux produced by the voltage windings 36 and 136.

The regulating device 30 includes a regulating winding 40 which is connected to conductors 41 and 42. These conductors are connected to conductors 20 and 22 of the bridge rectifier 17, which supplies direct-current excitation to the generator field winding 13. In this form of the invention, the regulating winding 40 furnishes the current which is rectified and delivered to the generator field winding. Voltage regulation is thereby directly procured and the excitation current is governed by the design of the regulating device 30, which is designed to produce the desired operating characteristics for the generator 11.

It is common knowledge that the necessary direct current for generator excitation to produce normal voltage at any desired power factor and load, is equal to the sum of the field current which compensates for the effect of magnetic saturation at the internal voltage and the vectorial sum of the field current necessary to obtain normal voltage on the air-gap line of the saturation curve on open circuit added at the proper power-factor angle to the field current necessary to obtain normal armature current on short circuit.

In the present invention, the resultant flux in leg 33 of core 31 is equal to the vectorial sum of the flux components produced by winding 35 and the windings 36 and 136 since these windings are energized by the current and voltage respectively of the generator. Since the flux components produced by the current and voltage of the generator have the same phase angle as the components of the excitation current above referred to and since the generator current varies with the short-circuit excitation current and the generator voltage varies with the no-load excitation current, it follows that the resultant flux in leg 33 and the induced voltage in regulating winding 40 vary with the excitation current required to operate the generator at a predetermined voltage with change of load. It will thus be seen that if the load on the generator is increased, the current increases and the induced voltage in regulating winding 40 correspondingly increases. Likewise, if the power factor of the load is changed, a corresponding change in angle between the flux components in leg 33 occurs which produces a corresponding change in the induced voltage in regulating winding 40. This increase in induced voltage in winding 40 operates upon the bridge rectifier 17 and supplies a corresponding increase in field excitation current, which is of such a magnitude as to supply the added field excitation current necessary to take care of the added load and that necessary to maintain the desired voltage where a constant voltage is desired. Automatic and inherent regulation is hence procured and the field excitation current of the generator is at all times automatically maintained at the proper value throughout the load range of the generator to produce the desired voltage regulation.

Figure 2:
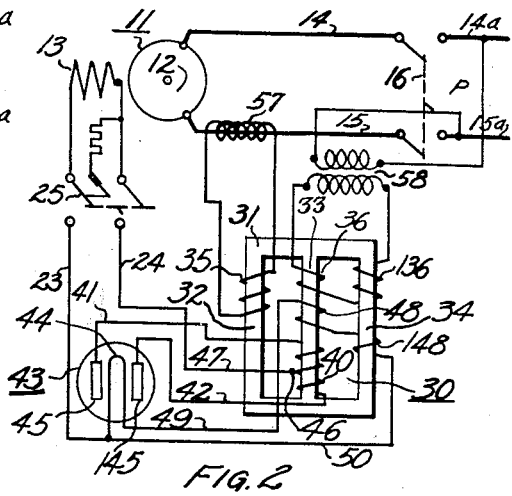
Fig. 2 is a view similar to Figure 1 showing a modification of the invention.

In Fig. 2 I have shown a modification of the invention illustrated in Fig. 1. Since most of the parts or elements of this form of the invention are identical with those shown in Fig. 1, the description thereof will not be repeated and the same reference numerals will be used to designate corresponding parts or elements. In Fig. 2, the current for energizing winding 35 is procured from a current transformer 57 which is directly energized by the current through lead 15; and the voltage for energizing windings 36 and 136 is procured from a voltage transformer 58 which is energized by the generator or line voltage. In this form of the invention, the bridge rectifier 17 is dispensed with and a thermionic full-wave rectifier, indicated in its entirety by the reference numeral 43, is utilized. The thermionic full-wave rectifier 43 comprises a cathode 44, and two anodes, 45 and 145. Anode 45 is connected to the regulating winding 40 by conductor 41 and the other anode 145 is connected to the other terminal of the regulating winding 40 by conductor 42. A center tap 46 of the regulating winding 40 is connected to a conductor 47 which is connected to the field switch 25.

The cathode 44 is of the filament type and is heated by external means. For this purpose two heater windings, 48 and 148 are used, the winding 48 being disposed on leg 33 and the winding 148 on leg 34. These windings are connected in series and are connected to the filament 44 by means of conductors 49 and 50. The filament 44 is connected to the field switch 25 by means of conductor 23.

The operation of this form of the invention is similar to that of the invention shown in Fig. 1. The thermionic full-wave rectifier 43 supplies excitation current directly to the generator field winding 13 and this current is regulated in accordance with the current, voltage and power factor of the load, to produce the desired voltage regulation.

For providing initial excitation current a separate source of direct current such as is shown in Fig. 1 may be used or where the generator is to be connected to a live power system, the voltage windings 36 and 136 may be used for the purpose. In such case the transformer 58 energizing these windings is connected to the leads 14a and 15a instead of to the leads 14 and 15.

Figure 3:
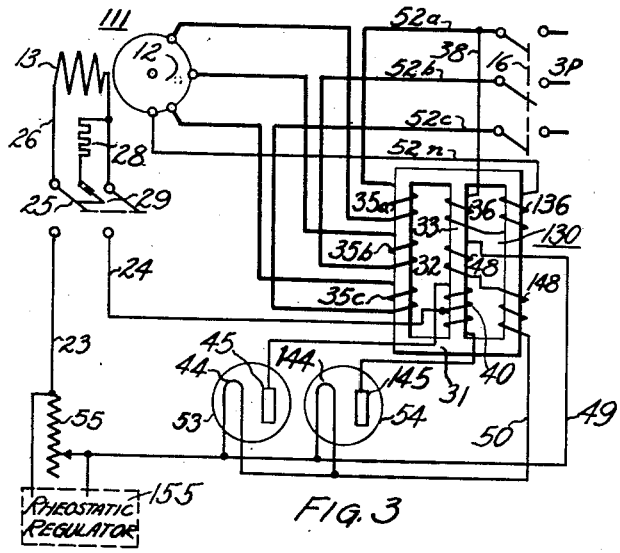
Fig. 3 is a view similar to Figure 1 showing another modification of the invention for use with polyphase power.

In Fig. 3 I have shown an embodiment of my invention utilizing a three-phase alternating-current generator 111. Since this generator is similar to generator 11, the same reference numerals will be used to designate similar parts, including the field excitation circuit and the switch therein. Generator 111 supplies three-phase electric power through switch 16 to the power supply circuit 3P. Switch 16 is connected by means of three leads 52a, 52b, and 52c to the armature 12 of the generator 111. A lead 52n is connected to the neutral of the armature winding 12 of generator 11, and its use will be subsequently described.

A regulating device 130 is used instead of the regulating device 30 which only differs from the regulating device 30 in having three current windings 35a, 35b, and 35c on the leg 32 of core 31 instead of the single winding 35. These windings are connected in the leads 52a, 52b, and 52c, respectively, and receive the full current passing through the three phases of the generator 111. The two voltage windings 36 and 136 are connected across one phase only, which is accomplished by connecting lead 52n to winding 136, and by running the conductor 38 connected to winding 36 to the lead 52a. In order to prevent the three flux components produced by windings 35a, 35b, and 35c from neutralizing one another, two of these windings are reversed. To cause the flux components of these windings and the flux component of windings 36 and 136 to flow in leg 33 in a manner to make the resultant flux in this leg greater than either component, it is necessary to reverse the current windings in the leads to which the voltage windings are not connected. This would be the windings 35b and 35c.

A thermionic rectifier may be used with the regulating device 130 if desired. This rectifier would be connected to the regulating winding 40, the heater windings 48 and 148, and the field switch 25 in identically the same manner as the rectifier shown in Fig. 2. For the purpose of illustration, two half-wave rectifiers 53 and 54 have been used instead of a full-wave rectifier. The two anodes 45 and 145 thereof are connected to the regulating winding 40 and the two filaments or cathodes 44 and 144 thereof are connected in parallel to the heater windings 48 and 148.

In some cases at light loads on the generator, the voltage regulation becomes somewhat unstable when operating at low magnetic saturation of the core 31 of the regulating device. In order to stabilize the generator voltage, I include a conventional stabilizing rheostatic regulator 155 (shown in the lower left corner of Fig. 3) which is responsive to the generator voltage and operates upon a field rheostat 55 in the field winding circuit of the generator. Such field rheostat is connected in series in conductor 23. Since this conventional field rheostat and rheostatic regulator do not form a part of this invention, its specific parts and connections will not be pointed out and described in detail.

Figure 4:
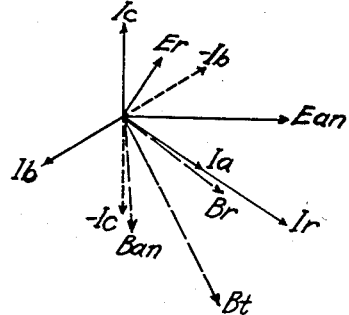
Fig. 4 is a vector diagram illustrating graphically the operation of my invention as shown in Figure 3.

Fig. 4 is a vector diagram illustrating the relation between the voltages, currents and fluxes in the form of the invention shown in Fig. 3, the voltage vectors are designated by the reference character E with suffixes indicating the leads across which the voltages are taken. The current vectors are indicated by the reference character I together with similar suffixes indicating the leads in which the currents flow. The suffix $r$ denotes resultant in both cases. The flux vectors are indicated by the reference character B with a suffix designating its source. In the case of the flux the suffix $t$ denotes the total. It will thus be seen that E$an$ represents the voltages from lead 52a to the neutral lead 52n going to the star or neutral point of the armature 12.

In Fig. 4 the relation of the various vectors for 80% power-factor lagging full-load operation has been shown. In such case the generator currents will lag their respective voltages to neutral, which are represented by Ia, Ib, and Ic. My invention utilizes the voltage Ean for energizing the voltage windings 36 and 136. Since all three currents are used, the vectorial sum of the same would be zero. To overcome this, two of the current windings, namely 35b and 35c are reversed. Thus the vectorial sum of the three currents Ia, −Ib and −Ic is a finite quantity and is represented by the vector Ir. Since the current windings are reactive, the resultant current Ir, must lag its corresponding voltage Er by an angle somewhat less that 90° as shown. This voltage Er produces in leg 33 a flux Br which varies therewith. Similarly Ean produces a flux Ban in legs 33 and 34, and the amount of this flux varies with said voltage. These fluxes combine in leg 33 to produce a total flux Bt that is equal to the vectorial sum of the aforementioned fluxes, and as hereinbefore explained, the total flux Bt is proportional to the field excitation current necessary to produce normal voltage at 80% power-factor lagging with full load on the generator.

At no load, the voltage windings 36 and 136 produce in the center leg 33 flux of a magnitude proportional to the field excitation current necessary to produce normal voltage. At any intermediate load as well as at full load, the voltage windings and current windings cooperate to produce in the center leg 33, flux of a magnitude proportional to the field excitation current necessary to produce normal voltage at 80% power factor for that load, and thereby maintain normal voltage at all loads.

Over-compounding so as to produce an increasing voltage with increase in load can be obtained by strengthening the current windings, which then produces a greater proportionate increase in the flux vector Br and in turn Bt which controls the amount of field excitation current to the generator field winding 13.

Similarly, under-compounding so as to produce a decreasing voltage with increase in load can be obtained by weakening the current windings, which then produces a smaller proportionate increase in the flux vector Br and in turn B$t$ which controls the amount of field excitation current to the generator field winding 13.

Figure 5:
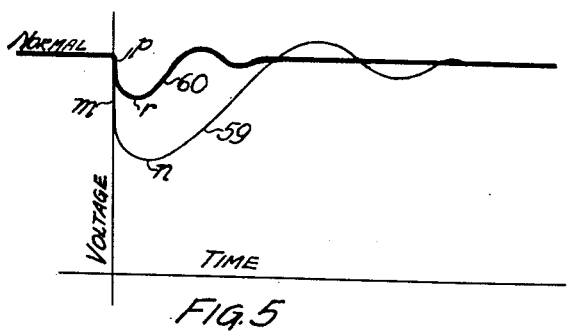
Fig. 5 is a curve diagram which will be referred to hereinafter.

The machine shown in Fig. 3 as will become evident from Fig. 4 has been designed for 80% power factor. It can readily be comprehended that the machine may be designed for 100% power factor or any other desired power factor. This is accomplished by varying the relation between the number of turns in the voltage windings and the current winding. In Fig. 5, I have shown a voltage diagram in which voltages are plotted against time. Curve 59 shows the average voltage response of the present commercial types of voltage regulators which respond only after a substantial change in voltage has taken place before operating to increase the excitation current. Normal voltage is shown by the horizontal line at the extreme left. After a change in voltage down to point $m$, the regulator begins to operate. Due to the time-lag of the regulator and the source of excitation, the generator voltage does not begin to increase until reaching point $n$, after which the voltage increases and may even increase beyond normal voltage, and then finally become normal.

Curve 60 shows a similar voltage response of a generator utilizing my invention which responds before any substantial change in voltage has taken place. In the case of the suddenly applied load, the increased current will instantly operate upon my regulating device before any substantial decrease in voltage can take place. In the case of the voltage dip due to any line disturbance, the decreased voltage will instantly operate upon my regulating device before any substantial decrease in generator voltage can take place. Thus my regulating device responds at point $p$ where the voltage is just beginning to change from its normal value. The drop in voltage down to point $r$ is due to the time lag of the source of excitation and the building up of the current in the generator field winding 13. By comparison it will readily be seen that curve 60 results in quicker and better voltage regulation than curve 59.

In Fig. 6, I have shown a modification of my invention applied to a three-phase generator 111 in which three regulating devices 30a, 30b and 30c are utilized. These regulating devices are similar to the regulating device of Fig. 3 except that only one current winding is disposed on each regulating device instead of three current windings. The description thereof will hence not be repeated and the same reference characters will be used to identify the identical parts. The reference suffixes $a$, $b$ and $c$ will be added to these reference characters to identify the parts of the respective regulating devices 30a, 30b and 30c. In this form of the invention, the current windings 35a, 35b, and 35c are disposed on legs 32a, 32b and 32c of the respective devices 30a, 30b and 30c. Also voltage windings 36a and 136a, 36b and 136b, and 36c and 136c are disposed on legs 33a and 34a, 33b and 34b, and 33c and 34c respectively and are energized by their respective phase voltages E$an$, E$bn$, and E$cn$.

Three pairs of heater windings 48a and 148a, 48b and 148b, and 48c and 148c are connected and energized as in Fig. 3 to furnish the cathode voltages to the six half-wave rectifiers 53a and 54a, 53b and 54b, and 53c and 54c respectively. The three regulating windings 40a, 40b, and 40c are also connected and energized as in Fig. 3 to furnish the anode voltages to the same six respective rectifiers. The direct-current output of these six rectifier supplies the direct-current excitation to the generator field winding 13 as previously described. It will be noted that each regulating device 30a, 30b and 30c operates in response to its respective phase voltage, current and power factor.

Each device in conjunction with its windings thereon and its pair of half-wave rectifiers operates to produce the necessary direct-current excitation to the generator field winding 13.

Since the operation of the form of the invention shown in Fig. 6 is similar to that shown in Fig. 3, the explanation thereof will not be repeated.

Fig. 7 is a vector diagram illustrating the relation between the voltages, currents and fluxes in the form of the invention shown in Fig. 6. The form of the invention shown in Fig. 6 has for the sake of illustration been designed for 80% power-factor lagging operation. Voltage vectors E$an$, E$bn$ and E$cn$ represent the phase voltages between the respective power supply-line leads and the neutral point. For 80% power-factor lagging operation, the generator currents lag their respective phase voltages to neutral by an angle of nearly 37 electrical degrees. Each phase voltage and its current energizes one device which operates to control the direct-current output of one pair of half-wave rectifiers. The phase voltages, energizing their voltage windings, serve to produce the flux vectors B$an$, B$bn$ and B$cn$ in the respective devices 30a, 30b and 30c. The generator currents, energizing their current windings, serve to produce the flux vectors B$a$, B$b$ and B$c$ in the same respective devices. These voltage and current fluxes combine in legs 33a, 33b and 33c of the devices 30a, 30b and 30c to produce total resultant fluxes, B$ta$, B$tb$ and B$tc$ which are equal to the vectorial sums of the aforementioned fluxes.

It will be noted that in the form of the invention shown in Fig. 3, the current windings 35a, 35b and 35c act collectively to produce the required flux in the regulating device 130 to give the necessary field excitation current, while in the form of the invention shown in Fig. 5, these current windings act independently and the direct currents produced thereby are combined to produce a resultant current of the required magnitude. It will become evident, however, that with six rectifiers instead of two, more nearly uniform direct current will be produced.

In Fig. 8, I have shown a further modification of my invention for a three-phase generator 111 utilizing a synchronous converter 62 for controlling the direct-current excitation to the generator field winding 13. This modification of my invention is somewhat similar to that shown in Fig. 6 except that no rectifiers are utilized and consequently no heater windings are required for energizing the cathodes or filaments of the rectifiers. In this modification, the induced voltages in regulating windings 40a, 40b and 40c on the respective center legs of the regulating devices 30a, 30b and 30c cooperate to supply a three-phase alternating current to the synchronous converter 62. The voltage of the direct-current output of the synchronous converter 62 is controlled by the input voltage of the alternating current which is obtained from the induced voltages in the regulating windings 40a, 40b, and 40c. Thus the induced voltages in the regulating windings directly control the direct-current output of the synchronous converter 62 which furnishes the direct current for energizing the shunt field winding 63 of the exciter or direct-current generator 64. A rheostat 65 is included in the shunt field circuit of the exciter 64 so that the direct-current excitation can be manually adjusted as desired.

The operation of generator 111 shown in Fig. 8 from no load up to full load is similar to that of the prior modifications of my invention in that the direct-current excitation to the generator field winding 13 increases with load to supply the necessary direct-current excitation to the generator field winding and thereby maintains substantially constant voltage. In case a small generator is used in the installation shown in Fig. 8, the exciter E may be dispensed with and the direct current from the synchronous converter 62 fed directly to the generator field winding 13.

In the forms of the invention shown in Figures 3, 6, and 8, no means for separate excitation has been illustrated to permit starting the generator from rest. It can, however, be readily comprehended that either of the types of construction shown in Figures 1 and 2 or any other suitable construction may be used for the purpose.

It will be understood that my invention is not limited to any specific type of rectifying device since it is obvious that thermionic rectifiers of both the half-wave and full-wave types, mercury arc rectifiers, copper-oxide rectifiers, synchronous converters and the like may be used. It will also be understood that suitable voltage or current transformers may be used on high-voltage systems or large-current systems. To obtain flexibility in the operative characteristics, taps may be used on the various windings and variable impedances may be inserted so that the desired characteristics will result.

It will also be understood that the various features of the different forms of the invention may be incorporated in any of the modifications disclosed, without departing from the spirit of the invention and that other modifications may be made by combining certain of the elements of one form with other elements of other forms of the invention.

My invention besides being applicable to one and three-phase systems as described herein, is obviously applicable to other polyphase systems by suitable changes which can be readily determined by one skilled in the art.

While theories have been advanced as to operation of the regulating device and methods here described, this has been done with a view to facilitating the description thereof and it is to be understood that I do not bind myself to these or any other theories.

The advantages of my invention are as follows: My invention provides a simple, automatic, and instantaneous means of regulating field excitation current which produces the desired voltage contemporaneously with increase of load whether gradually or suddenly applied. Similarly, alternating-current generators especially designed for extreme variations in load such as occur in steel mills having roll drives, may, by using my invention, be made to successfully maintain constant voltage or over-compounded voltage to carry peak loads much greater than they would carry with constant field excitation current fixed at normal full-load value. In such steel mills, the size and cost of the generator are largely determined by its capacity to carry peak loads. Thus my invention for increasing the peak-load capacity of any generator makes possible the use of a smaller and less expensive generator for any given application. With my invention, the generator voltage can be controlled to give a rising value or a falling value or even maintain a constant value— all with increasing load. It will also be noted that the efficiency of the generator is increased, the heating is decreased, and the operating characteristics of the system improved.

It will, of course, be understood that various changes may be made in the form, details, proportions and arrangements of the parts, without departing from the scope of my invention which, generally stated, consists in a device capable of carrying out the objects above set forth and in the novel parts and combination of parts disclosed and defined in the appended claims:

What I claim as new and desire to secure by Letters Patent of the United States is:

1. A regulating device for controlling the voltage of an alternating-current generator comprising a magnetic core having three legs in parallel, a voltage winding on one of said legs, a second voltage winding on another of said legs, said windings being connected in series and responsive to the voltage of said generator, a current winding on said third leg and responsive to the current of said generator, and a regulating winding on one of the first named legs, said regulating winding regulating the field excitation current to the generator 2. In a device for regulating the voltage of a polyphase generator, a magnetic core comprising a plurality of legs in excess of two arranged in parallel, voltage windings on a plurality of said legs, said windings being connected in series and energized by the voltage of one phase of said generator, a plurality of current windings on another of said legs, each of said current windings being energized by the current of one of said phases of the generator, and means energized by the magnetic flux through one of said legs having a voltage winding, said means controlling the field excitation current to said generator.

3. In a device for regulating the voltage of an alternating-current generator, a magnetic core comprising a plurality of legs in excess of two arranged in parallel, voltage windings on a plurality of said legs, said windings being connected in series and energized by the voltage of said generator, a current winding on another of said legs and connected in circuit with said generator, and means energized by the magnetic flux through one of said first named legs for controlling the field-excitation current to said generator.

4. In a device for regulating the voltage of an alternating-current generator, a magnetic core comprising three legs in parallel, a voltage winding on one of said legs, a second voltage winding on another of said legs, said windings being connected in series and energized by the voltage of said generator and being connected so as to produce components of magnetic flux in the same direction in one certain of said legs, a current winding on said third leg and connected in said generator, said current winding being connected so as to produce with the flux produced by said voltage winding a resultant magnetic flux in said aforementioned certain leg of greater magnitude than either of said component fluxes and a regulating winding on said aforementioned certain leg for controlling the field excitation current to said generator.

5. A regulating device for regulating the voltage of an alternating-current generator having an armature and a field winding, said regulating device comprising a magnetic core having a plurality of legs in excess of two arranged in parallel, voltage windings on a plurality of said legs, said windings being connected in series and energized by armature voltage, a current winding on a leg other than the legs having said voltage windings and energized by armature current, a regulating winding on one of said first named legs, and means controlled by said regulating winding for regulating excitation for said field winding.

6. A regulating device for regulating the voltage of an alternating-current generator having an armature and a field winding, said regulating device comprising a magnetic core having a plurality of legs in excess of two arranged in parallel, voltage windings on a plurality of said legs, said windings being connected in series and energized by armature voltage, a current winding on a leg other than the legs having said voltage windings and energized by armature current, a regulating winding on one of said first named legs, and means controlled by said regulating winding and including a rectifier for supplying and regulating excitation current to said field winding.

7. A regulating device for regulating the voltage of an alternating-current generator having an armature and a field winding, said regulating device comprising a magnetic core having a plurality of legs in excess of two arranged in parallel, voltage windings on a plurality of said legs, said windings being connected in series and energized by armature voltage, a current winding on a leg other than the legs having said voltage windings and energized by armature current, a plurality of regulating windings on said first named legs, and means controlled by said regulating windings including a rectifier energized by certain of said regulating windings, said means supplying and regulating excitation current to said field winding.

8. A regulating device for regulating the voltage of an alternating-current generator having an armature and a field winding, said regulating device comprising a magnetic core having a plurality of legs in excess of two arranged in parallel, voltage windings on a plurality of said legs, said windings being connected in series and energized by armature voltage, a current winding on a leg other than the legs having said voltage windings and energized by armature current, a regulating winding on one of said first named legs, a direct-current exciter for supplying excitation current for said generator field winding, and means controlled by said regulating winding for regulating the field excitation of said exciter.

9. A regulating device for regulating the voltage of an alternating-current generator, having an armature and a field winding, said regulating device comprising a magnetic core having a plurality of legs in excess of two arranged in parallel, voltage windings on a plurality of said legs, said windings being connected in series and energized by armature voltage, a current winding on a leg other than the legs having said voltage windings and energized by armature current, a plurality of regulating windings on said first named legs, a thermionic full-wave rectifier for supplying excitation current for said field winding, said rectifier having a cathode and anodes, certain of said regulating windings being connected to said cathode, and other of said windings being connected to said anodes, and a field excitation circuit connected to said field winding and energized by said rectifier.

10. A regulating device for regulating the voltage of an alternating-current generator having an armature and a field winding, said regulating device comprising a magnetic core having a plurality of legs in excess of two arranged in parallel, voltage windings on a plurality of said legs, said windings being connected in series and energized by armature voltage, a current winding on a leg other than the legs having said voltage windings and energized by armature current, a regulating winding on one of said first named legs, a circuit for supplying excitation current to said field winding, a rectifier having a cathode and an anode, one side of said regulating winding being connected to the anode, said regulating winding being further connected to said excitation circuit, means for connecting the cathode to said excitation circuit, and means for heating said cathode.

11. A regulating device for regulating the voltage of a three-phase alternating-current generator having an armature provided with windings connected in star formation and a field winding, said regulating device comprising three transformers, each transformer comprising a magnetic core having three legs arranged in parallel, voltage windings on two of the legs of each transformer, the voltage windings of each transformer being connected in series and being further connected together and to the terminals of the armature winding in star formation, current windings on the third legs of each transformer, said current windings being separately energized by the currents of the armature, a regulating winding on one of the first named legs of each transformer, thermionic rectifiers having cathodes and anodes, a circuit for supplying excitation to said field winding, said regulating windings being connected to corresponding rectifier anodes and to said excitation circuit, said cathodes being connected to said excitation circuit, and means for heating said cathodes.

12. A regulating device for regulating the voltage of an alternating-current generator having an armature and a field winding, said regulating device comprising a magnetic core having a plurality of legs in excess of two arranged in parallel, voltage windings on a plurality of said legs, said windings being connected in series and energized by armature voltage, a current winding on a leg other than the legs having said voltage windings and energized by armature current, a regulating winding on one of said first named legs, rectifier means for supplying excitation current to said field winding, and means connected to said regulating winding for energizing said rectifier means.

13. A regulating device for regulating the voltage of an alternating-current generator having an armature and a field winding, said regulating device comprising a magnetic core having a plurality of legs in excess of two arranged in parallel, voltage windings on a plurality of said legs, said windings being connected in series and energized by armature voltage, a current winding on a leg other than the legs having said voltage windings and energized by armature current, a regulating winding on one of said first named legs, a synchronous converter for controlling the excitation current to said field winding, and a circuit including said regulating winding for energizing said synchronous converter.

14. A regulating device for regulating the voltage of an alternating-current generator having an armature and a field winding, said regulating device comprising a magnetic core having a plurality of legs in excess of two arranged in parallel, voltage windings on a plurality of said legs, said windings being connected in series and energized by armature voltage, a current winding on a leg other than the legs having said voltage windings and energized by armature current, a regulating winding on one of said first named legs, a direct-current exciter including a field winding rectifier means for supplying excitation current to said exciter field winding, and means controlled by said regulating winding for energizing said rectifier means.

15. In a device for regulating the voltage of an alternating-current generator, inductive means producing in a portion of a magnetic circuit a magnetic flux component varying with the generator voltage, other inductive means producing in the same portion of said magnetic circuit a flux component varying with the generator load current, said inductive means being arranged to produce in said portion of the magnetic circuit a resultant flux of a magnitude greater than the magnitude of either of said flux components, and regulating means energized by the resultant to said generator.

16. A regulating device for regulating the voltage of an alternating-current generator having an armature and a field winding, said regulating device comprising a magnetic core having a plurality of legs in excess of two arranged in parallel, voltage windings on a plurality of said legs, said windings being connected in series and energized by armature voltage, a current winding on a leg other than the legs having said voltage windings and energized by armature current, a regulating winding on one of said first named legs, a circuit for supplying excitation current to said field winding, a rectifier having a cathode and an anode, one side of said regulating winding being connected to the anode, said regulating winding being further connected to said excitation circuit, and means for connecting the cathode to said excitation circuit.

17. A regulating device for controlling the voltage of an alternating-current generator comprising means responsive to the voltage of the generator for producing a magnetic flux component, means responsive to the current of the generator for producing a magnetic flux component, means for adding said flux components to produce a resultant magnetic flux of greater magnitude than either of said flux components and means responsive to said resultant magnetic flux for regulating the supply of excitation current to said generator.

EDWIN W. SWANSON.